United States Patent [19]
Araki

[11] Patent Number: 5,325,285
[45] Date of Patent: Jun. 28, 1994

[54] PARALLEL RUNNING CONTROL APPARATUS FOR PWM INVERTERS

[75] Inventor: Hiroshi Araki, Inazawa, Japan

[73] Assignee: Mitsubishi Denki Kabushiki Kaisha, Tokyo, Japan

[21] Appl. No.: 928,043

[22] Filed: Aug. 11, 1992

[30] Foreign Application Priority Data

Aug. 21, 1991 [JP] Japan ................. 3-209359

[51] Int. Cl.$^5$ ............................................. H02M 1/08
[52] U.S. Cl. ..................................... 363/71; 363/41; 363/80; 307/51
[58] Field of Search ............ 363/55, 56, 57, 58, 363/71, 72, 64, 5, 40, 41, 78; 361/18; 307/53, 51

[56] References Cited

U.S. PATENT DOCUMENTS

| | | | |
|---|---|---|---|
| 4,180,853 | 12/1979 | Scorso, Jr. et al. | 363/96 |
| 4,670,832 | 6/1987 | Park | 363/98 |
| 4,673,823 | 6/1987 | Tanaka | 307/11 |
| 4,717,833 | 1/1988 | Small | 363/71 |
| 4,748,340 | 5/1988 | Schmidt | 307/53 |
| 4,802,079 | 1/1989 | Mizoguchi | 363/71 |
| 4,947,310 | 8/1990 | Kawabata et al. | 363/71 |
| 5,016,158 | 5/1991 | Matsui et al. | 363/71 |
| 5,191,519 | 3/1993 | Kawakami | 363/71 |
| 5,212,630 | 5/1993 | Yamamoto et al. | 363/71 |

FOREIGN PATENT DOCUMENTS

| | | | |
|---|---|---|---|
| 0010080 | 2/1981 | Japan | 363/71 |
| 0102878 | 6/1985 | Japan | 363/71 |
| 63-287371 | 11/1988 | Japan | |

Primary Examiner—Steven L. Stephan
Assistant Examiner—Ben Davidson
Attorney, Agent, or Firm—Leydig Voit & Mayer

[57] ABSTRACT

A parallel running control apparatus for two PWM inverters includes a first and a second electric current detector for detecting AC output electric current of the PWM inverters; a first and a second electric current control circuit for outputting, on the basis of the output electric current, three-phase voltage command values of the corresponding inverters; and a first and a second pulse generating circuit for outputting, on the basis of the three-phase voltage command values, command pulses which controllably turn on and off the corresponding inverters. This apparatus also includes a first and a second driver circuit for turning, on the basis of the command pulses, on and off switching elements of the corresponding inverters; a circulating current computing element for computing, on the basis of the output electric current, a circulating current flowing between the two inverters; and a parallel running inhibition circuit for interrupting one inverter when the circulating current computed by the circulating current computing element exceeds a predetermined value.

3 Claims, 3 Drawing Sheets

PARALLEL RUNNING CONTROL APPARATUS FOR PWM INVERTERS

BACKGROUND OF THE INVENTION

1. Field of the Invention

This invention relates to a parallel running control apparatus for pulse-width modulation (PWM) inverters in which a plurality of PWM inverters are run in parallel to perform a variable speed control for an AC motor or the like.

2. Description of the Related Art

FIG. 2 is a diagram showing the main circuitry of interphase reactor multiple inverters disclosed in, for example, Japanese Patent Laid-Open No. 63-287371. In FIG. 2, a first inverter INVa and a second inverter INVb are connected in parallel to a DC voltage source 1. The first inverter INVa has transistors $8a$ to $13a$ and three pairs of reflux diodes $2a$ and $3a$, $4a$ and $5a$, and $6a$ and $7a$. The transistors $8a$ to $13a$ are connected in parallel to the diodes $2a$ to $7a$ of the three pairs of reflux diodes. Likewise, the second inverter INVb has transistors $8b$ to $13b$ and three pairs of reflux diodes $2b$ and $3b$, $4b$ and $5b$, and $6b$ and $7b$. The transistors $8b$ to $13b$ are connected in parallel to the diodes $2b$ to $7b$ of the three pairs of reflux diodes.

Reference characters $14a$ to $16a$ and $14b$ to $16b$ denote interphase reactors for connecting the output terminals of the first and second inverters INVa and INVb, respectively. Reference characters $17a$ to $19a$ and $17b$ to $19b$ denote electric current detectors for detecting the output electric current of the first and second inverters INVa and INVb, respectively. Numeral 20 denotes the load of an AC motor or the like. The AC motor is connected to nodes between the interphase reactor pairs $14a$ and $14b$, $15a$ and $15b$, and $16a$ and $16b$ so as to obtain from the nodes a multiple and parallel three-phase output.

When such inverters are connected in parallel and a variable speed operation is performed for the AC motor, a type of conventional parallel running control apparatus (not shown) supplies a common electric current command to both inverters, and then controls the inverters so that the electric current command agrees with a detected value of an AC output electric current from the inverters. Both inverters generate PWM pulses on the basis of carrier signals common to both inverters.

As shown in FIG. 3, in another type of known parallel running control apparatus, AC detection signals obtained by the electric current detectors $17a$ to $19a$ of the first PWM inverter INVa and by the other electric current detectors $17b$ to $19b$ of the second PWM inverter INVb are converted into DC signals by coordinate converters $25a$ and $25b$, respectively. The DC signals are matched with electric current command signals $21a$ and $21b$. Differences found as a result of such matching are input to electric current control circuits $22a$ and $22b$. Pulse generating circuits $23a$ and $23b$ and driver circuits $24a$ and $24b$ control the PWM inverters so that three-phase AC voltage is generated.

In the above conventional parallel running control apparatuses for PWM inverters, since the carrier signals are common to both inverters, the time when the PWM pulse is generated is determined by each of the inverters independently of each other, thus making it difficult to generate the PWM pulse of one inverter at the same time as the PWM pulse of another inverter is generated. For this reason, an AC reactor must be used to suppress a circulating current flowing between the inverters. In inverters with a large capacity, the AC reactor becomes large, thus increasing loss.

SUMMARY OF THE INVENTION

The present invention has been made to solve the above problems, and the object thereof is to provide a parallel running control apparatus for PWM inverters which is capable of safely running the inverters without using a large reactor or a resistor.

In order to achieve the above object, according to this invention, there is provided a parallel running control apparatus for two PWM inverters. This apparatus comprises a first and a second electric current detector for detecting AC output electric current of the two PWM inverters, respectively; a first and a second electric current control circuit for outputting, on the basis of the output electric current detected by the first and second electric current detectors, three-phase voltage command values of the corresponding inverters; a first and a second pulse generating circuit for outputting, on the basis of the three-phase voltage command values output from the first and second electric current control circuits, command pulses which controllably turn on and off the corresponding inverters; a first and a second driver circuit for turning, on the basis of the command pulses generated by the first and second pulse generating circuits, on and off switching elements of the corresponding inverters; circulating current computing means for computing, on the basis of the output electric current of the two inverters detected by the first and second electric current detectors, a circulating current flowing between the two inverters; and parallel running inhibition means for generating and transmitting a base interruption signal to the first driver circuit one when the circulating current exceeds a predetermined value, and a load reducing circuit which decreases the load of the second inverter when the circulating current exceeds the predetermined value.

DESCRIPTION OF THE PREFERRED EMBODIMENT

Figure 1:
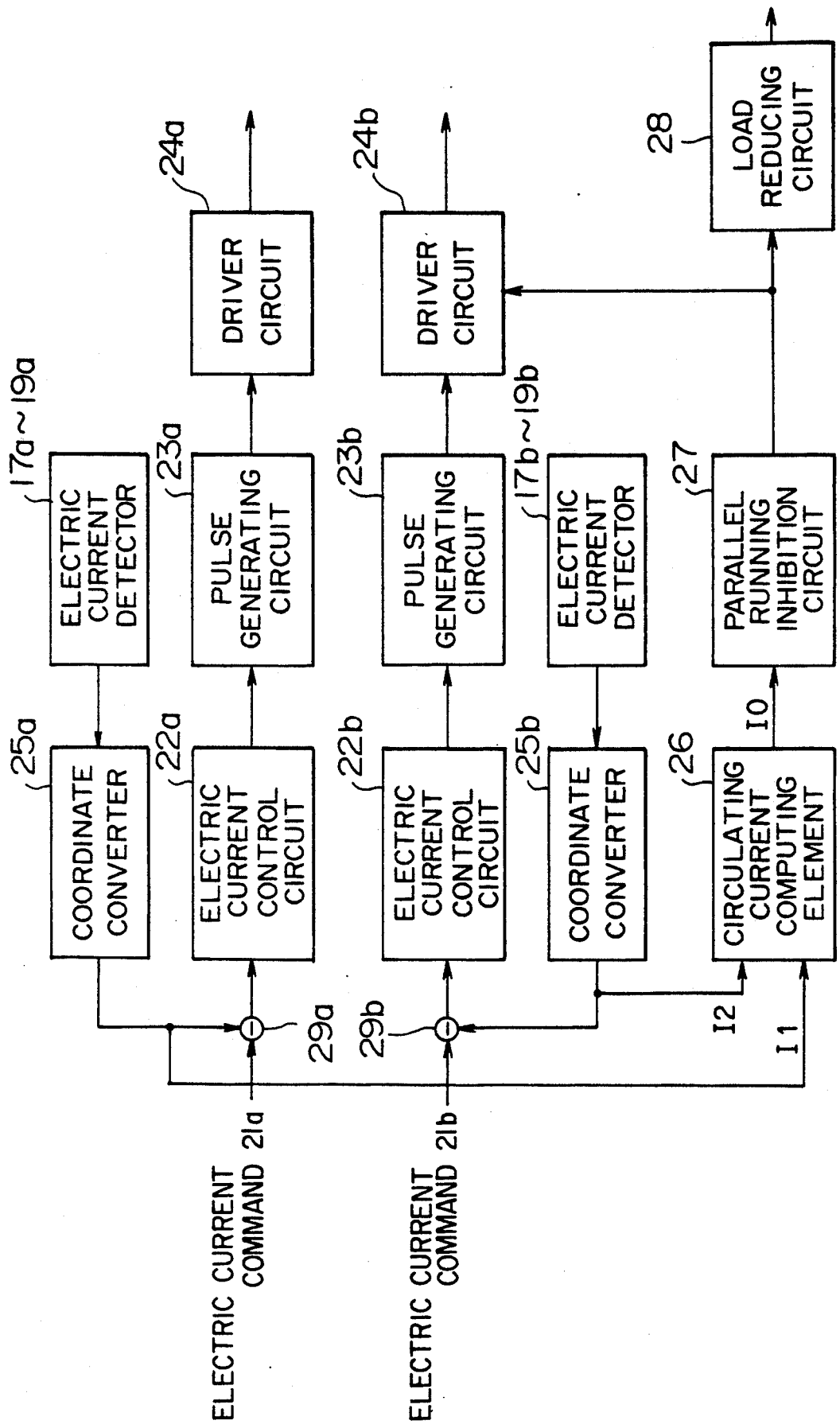
FIG. 1 is a block diagram showing an embodiment of a parallel running control apparatus for PWM inverters in accordance with the present invention.
Figure 2:
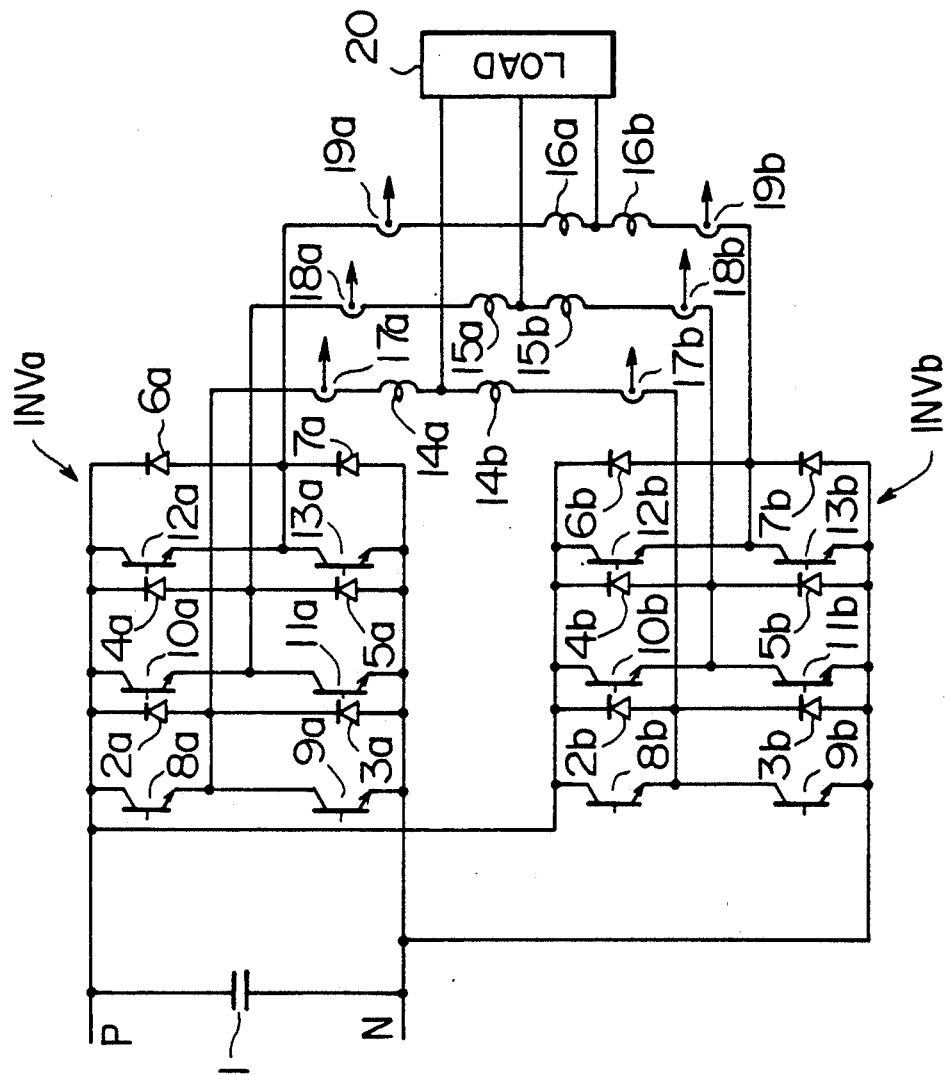
FIG. 2 is a diagram showing the main circuitry of PWM inverters.
Figure 3:
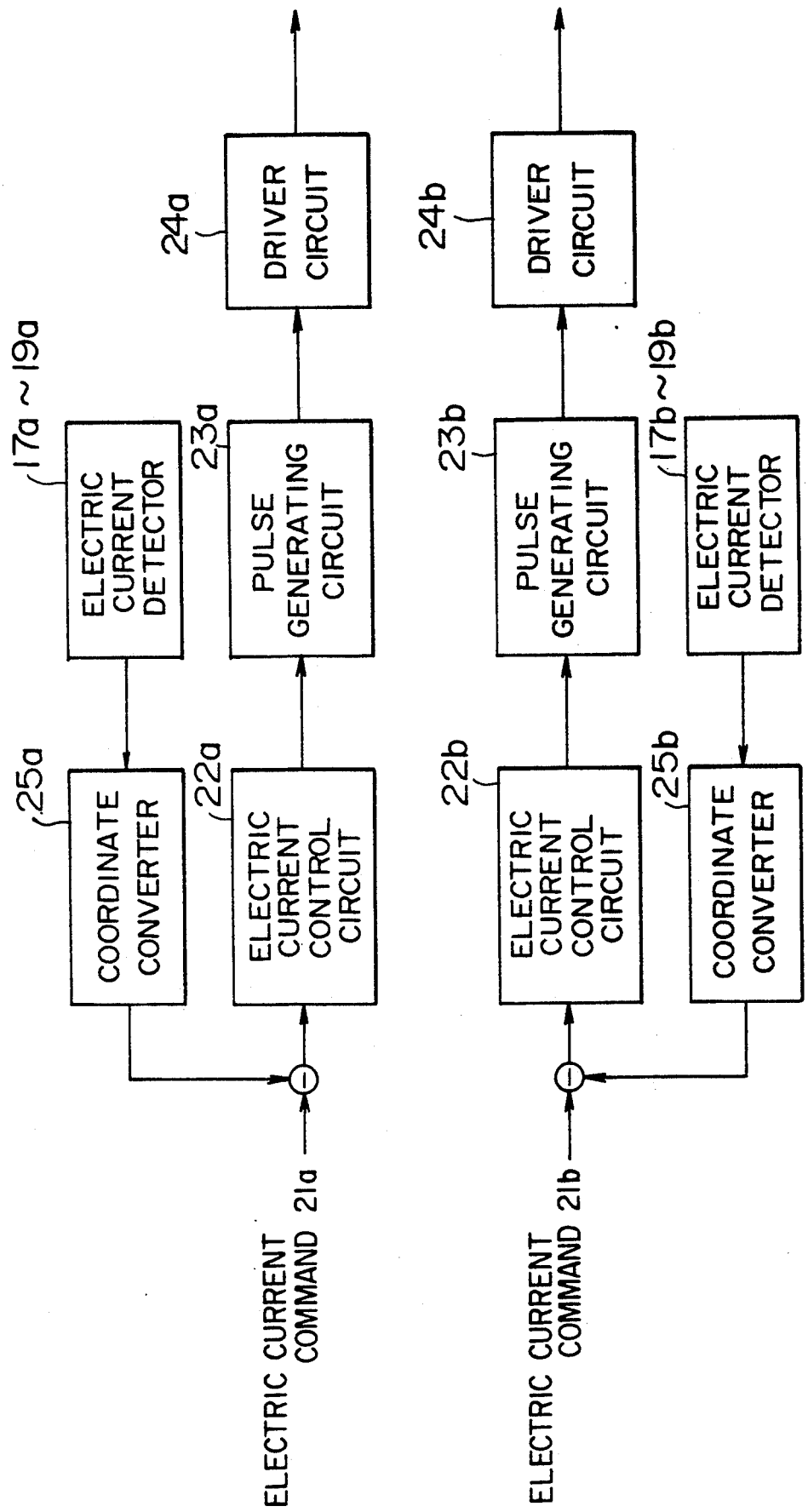
FIG. 3 is a block diagram of a conventional parallel running control apparatus.

The preferred embodiment of the present invention will be described below with reference to the accompanying drawings. In FIG. 1, components denoted by $17a$ to $19a$, $21a$ to $25a$, $17b$ to $19b$ and $21b$ to $25b$ are the same components as those described in FIGS. 2 and 3. Coordinate converters $25a$ and $25b$ are connected to electric current detectors $17a$ to $19a$ and $17b$ to $19b$, respectively. The detectors $17a$ to $19a$ and $17b$ to $19b$ are used for detecting output electric current in each phase of first and second inverters INVa and INVb, respectively. Electric current control circuits $22a$ and $22b$ are connected to the coordinate converters $25a$ and $25b$ through subtracters $29a$ and $29b$, respectively. Driver circuits $24a$ and $24b$ for turning on and off the switching elements in the first and second inverters INVa and INVb are linked to the electric current control circuits 22a and 22b via pulse generating circuits 23a and 23b, respectively.

A circulating current computing element 26 is connected to the coordinate converters 25a and 25b, whereas a parallel running inhibition circuit 27 is connected to the circulating current computing element 26. The output of the parallel running inhibition circuit 27 is connected to a load reducing circuit 28 and the driver circuit 24b, the latter circuit corresponding to the second inverter INVb.

The circulating current computing element 26 calculates a circulating current $I_0$ based on the following equation:

$$I_0 = (I_1 + I_2)/2$$

where
- $I_1$ is the output electric current of the first inverter INVa which is detected by the electric current detectors 17a to 19a, coordinates of which electric current are converted by the coordinate converter 25a, and
- $I_2$ is the output electric current of the second inverter INVb which is detected by the electric current detectors 17b to 19b, coordinates of which electric current are converted by the coordinate converter 25b.

When the circulating current $I_0$, which is the output of the circulating current computing element 26, exceeds a predetermined value, the parallel running inhibition circuit 27 outputs a base interruption signal used for the second inverter INVb to the driver circuit 24b. The load reducing circuit 28 decreases the load of the other inverter, that is, the first inverter INVa, base of which is not interrupted by the parallel running inhibition circuit 27.

In operation, the output electric current of the first inverter INVa is detected by the electric current detectors 17a to 19a. An AC detection signal is converted into a DC signal by the coordinate converter 25a. The DC signal is matched with an electric current command signal 21a by the subtracter 29a, and then input to an electric current control circuit 22a, where it is controlled so as to compensate for a difference found as a result of such matching. A pulse generating circuit 23a produces a PWM pulse on the basis of a three-phase voltage command value and a triangular wave carrier, which are the outputs from the electric current control circuit 22a and an unillustrated carrier wave generator, respectively. The PWM pulse is used for turning on and off transistors 8a to 13a, which are switching elements, in the first inverter INVa. The driver circuit 24a controls the first inverter INVa on the basis of the PWM pulse to generate three-phase AC voltage.

Similarly, the output electric current of the second inverter INVb is detected by the electric current detectors 17b to 19b. An AC detection signal is converted into a DC signal by the coordinate converter 25b. The DC signal is matched with an electric current command signal 21b by the subtracter 29b, and then input to an electric current control circuit 22b, where it is controlled so as to compensate for a difference found as a result of such matching. A pulse generating circuit 23b produces the PWM pulse on the basis of the three-phase voltage command value and the triangular wave carrier, which are the outputs from the electric current control circuit 22b and the unillustrated carrier wave generator, respectively. The PWM pulse is used for turning on and off transistors 8b to 13b, which are switching elements, in the second inverter INVb. The driver circuit 24b controls the second inverter INVb on the basis of the PWM pulse to generate three-phase AC voltage.

The circulating current computing element 26 calculates the circulating current $I_0$ based on the following equation:

$$I_0 = (I_1 + I_2)/2$$

where
- $I_1$ is the output electric current of the first inverter INVa which is detected by the electric current detectors 17a to 19a, coordinates of which electric current are converted by the coordinate converter 25a, and
- $I_2$ is the output current of the second inverter INVb which is detected by the electric current detectors 17b to 19b, coordinates of which electric current are converted by the coordinate converter 25b.

When the circulating current $I_0$ exceeds the predetermined value, the base interruption signal used for the second inverter INVb is output from the parallel running inhibition circuit 27 to the driver circuit 24b. The load reducing circuit 28 outputs a command for decreasing the load of the first inverter INVa.

In other words, if the time when the PWM pulse of the first inverter INVa is generated is different from that of if the second inverter INVb and the circulating current $I_0$ exceeding the predetermined value flows between these inverters, then the base of the first inverter INVa is interrupted, and only the second inverter INVb is run. For this reason, it is possible to safely run inverters without using a very large reactor to prevent a circulating current.

What is claimed is:

1. A parallel running control apparatus for first and second PWM inverters, output terminals of the inverters being connected to each other through interphase reactors, said apparatus comprising:
    - a first and a second electric current detector for detecting AC output electric current of the first and second PWM inverters, respectively;
    - a first and a second electric current control circuit for outputting, on the basis of the output electric current detected by said first and second electric current detectors, three-phase voltage command values of the first and second inverters;
    - a first and a second pulse generating circuit for outputting, on the basis of the three-phase voltage command values output from said first and second electric current control circuits, command pulses which controllably turn on and off the first and second inverters;
    - a first and a second driver circuit for turning, on the basis of the command pulses generated by said first and second pulse generating circuits, on and off switching elements of the first and second inverters;
    - circulating current computing means for computing, on the basis of the output electric current of the first and second inverters detected by said first and second electric current detectors, a circulating current flowing between the first and second inverters;
    - parallel running inhibition means for generating and transmitting a base interruption signal to said first driver circuit when the circulating current exceeds a predetermined value; and a load reducing circuit which decreases the load of the second inverter when the circulating current exceeds the predetermined value.

2. A parallel running control apparatus as claimed in claim 1 wherein said first and second electric current control circuits output the three-phase voltage command values so that values of the output electric current detected by said first and second electric current detectors agree with electric current command values.

3. A parallel running control apparatus as claimed in claim 1 further comprising a first and a second coordinate converter for converting AC output electric current detected by said first and second electric current detectors into DC electric current, wherein said first and second electric current control circuits input values of DC electric current converted by said first and second coordinate converters, and wherein said circulating current computing means inputs the values of DC electric current converted by said first and second coordinate converters.

* * * * *